United States Patent
Lee et al.

(10) Patent No.: US 10,317,278 B2
(45) Date of Patent: Jun. 11, 2019

(54) AMBIENT LIGHT SENSOR WITH PHOTODIODE LEAKAGE CURRENT COMPENSATION

(71) Applicant: DYNA IMAGE CORP., New Taipei (TW)

(72) Inventors: Sheng-Cheng Lee, New Taipei (TW); Wen-Sheng Lin, New Taipei (TW); Shih-Hao Lan, New Taipei (TW)

(73) Assignee: DYNA IMAGE CORP. (TW)

( * ) Notice: Subject to any disclaimer, the term of this patent is extended or adjusted under 35 U.S.C. 154(b) by 140 days.

(21) Appl. No.: 15/643,641

(22) Filed: Jul. 7, 2017

(65) Prior Publication Data
US 2018/0266879 A1 Sep. 20, 2018

(30) Foreign Application Priority Data
Mar. 17, 2017 (CN) .......................... 2017 1 0161386

(51) Int. Cl.
*G01J 1/42* (2006.01)
*G01J 1/44* (2006.01)
*G01J 1/02* (2006.01)

(52) U.S. Cl.
CPC ........... *G01J 1/4204* (2013.01); *G01J 1/0219* (2013.01); *G01J 1/0228* (2013.01); *G01J 1/0233* (2013.01); *G01J 1/0252* (2013.01); *G01J 1/0271* (2013.01); *G01J 1/0295* (2013.01); *G01J 1/4228* (2013.01); *G01J 1/44* (2013.01); *G01J 2001/0257* (2013.01); *G01J 2001/444* (2013.01)

(58) Field of Classification Search
CPC ....... G01J 1/4204; G01J 1/44; G01J 2001/444
See application file for complete search history.

(56) References Cited

U.S. PATENT DOCUMENTS

| 2008/0073490 A1* | 3/2008 | Koide | G01J 1/4204 250/214 C |
| 2008/0157682 A1* | 7/2008 | Kwon | G09G 3/3406 315/154 |
| 2009/0202259 A1* | 8/2009 | Tourette | G01J 1/44 398/202 |

* cited by examiner

*Primary Examiner* — Georgia Y Epps
*Assistant Examiner* — Don J Williams

(57) ABSTRACT

Differing from conventional ambient light sensors at least having drawbacks of huge circuit area and high manufacturing cost, the present invention discloses an ambient light sensor showing advantages of small circuit area and low manufacturing cost. This ambient light sensor has functionality of photodiode leakage current compensation, and comprises: a temperature sensing unit, a microprocessor unit, a conversion unit, and a lookup table unit. The microprocessor unit is configured to find out a reference parameter for a first dark current from the lookup table unit according to a measured data of ambient temperature. Subsequently, the conversion unit is controlled to apply a current amplifying process to a second dark current. Therefore, after subtracting an output current of the first photodiode from the second dark current been treated with the current amplifying process, the output current been treated with a leakage current compensating process is produced and outputted.

7 Claims, 7 Drawing Sheets

AMBIENT LIGHT SENSOR WITH PHOTODIODE LEAKAGE CURRENT COMPENSATION

BACKGROUND OF THE INVENTION

1. Field of the Invention

The present invention relates to the technology field of electronic circuits, and more particularly to an ambient light sensor with photodiode leakage current compensation.

2. Description of the Prior Art

With the high development of smart phones, mobile phones are not limited to be a simple communication tool, especially that more and more advanced technologies such as AR (Augmented Reality) and VR (Virtual Reality) are implemented in the smart phones. There are several sensors disposed in a commercial smart phone, including ambient light sensor, proximity sensor, G-sensor, accelerometer sensor, magnetism sensor, gyroscope, and global positioning system (GPS). Moreover, some high-end smart phones may further disposed with at least one physiological sensor for monitoring or collecting personal physiological data, like pulse oximeter, heart rate sensor, and fingerprint sensor.

Please refer to FIG. 1, which illustrates a top view of a smart phone. As FIG. 1 shows, an optical sensing module applied in the smart phone 1' usually comprises an ambient light sensor 13' and a proximity sensor 12'. In the optical sensing module, the proximity sensor 12' is used for detecting distance between a phone receiver 14' of the smart phone 1' and an object like a user's ear. Moreover, the ambient light sensor 13' is adopted to sense the brightness of an ambient light such as sunlight. During the operation of the proximity sensor 12', when the user puts the phone receiver 14' in close proximity corresponds to his ear (i.e., the aforesaid object 3'), a main controlling circuitry of the smart phone 1' is immediately informed to switch off the touch screen for preventing user's face accidentally touch that. On the other hand, when the user is using the smart phone 1', the ambient light sensor 13' is configured to sense the brightness variation of the ambient light, so as to facilitate the main controlling circuitry of the smart phone 1' be able to properly adjust the backlight brightness of the touch screen with the brightness variation of the ambient light.

Please continuously refer FIG. 2, where a circuit architecture diagram of the ambient light sensor is provided. As FIG. 2 shows, the conventional ambient light sensor 13' comprises: a silicon substrate 131', a first diffusion region 132', a second diffusion region 133', a metal cover 134', and a calculation unit 135'. It is worth noting that, the first diffusion region 132' and the silicon substrate 131' constitute a first photodiode, and a second photodiode is formed by the second diffusion region 133' and the silicon substrate 131'. During the operation of the ambient light sensor 13', the first photodiode would correspondingly output a first photocurrent $I_1'$ after receiving an irradiation sunlight (i.e., the ambient light). At the same time, the second photodiode would still output a second photocurrent $I_2'$ with the variation of an ambient temperature although it is unable to receive the ambient light due to the shielding of the metal cover 134'.

It needs to further explain that the aforesaid second photocurrent means a leakage current of the second photodiode, which is also called "dark current". On the other hand, because the first diffusion region 132' and the second diffusion region 133' have the same area size, the intensity level of the leakage current of the first photodiode should be equal to the second photodiode's. Based on such physics principle of semiconductor device, the ambient light sensor 13' is able to generate an output current $I_{out}'$ been treated with a leakage current compensating process after using the calculation unit 135' to complete a subtraction operation between the first photocurrent $I_1'$ and the second photocurrent $I_1'$.

As engineering skill in development and design of integrated circuit (IC) know, a circuit area of photodiode is 200,000 times of a circuit area of MOSFET. Thus, it is able to understand that, despite a specific leakage current compensating solution using the second photodiode is implemented in the conventional ambient light sensor 13', the ambient light sensor 13' is still not perfect because of at least having drawbacks of huge circuit area and high manufacturing cost. For above reasons, the inventors of the present application have made great efforts to make inventive research thereon and eventually provided an ambient light sensor with photodiode leakage current compensation.

SUMMARY OF THE INVENTION

The primary objective of the present invention is to provide an ambient light sensor with photodiode leakage current compensation. Differing from conventional ambient light sensors at least having drawbacks of huge circuit area and high manufacturing cost, the present invention discloses an ambient light sensor showing advantages of small circuit area and low manufacturing cost. This ambient light sensor has functionality of photodiode leakage current compensation, and comprises: a temperature sensing unit, a microprocessor unit, a conversion unit, and a lookup table unit. Under the operation of the ambient light sensor of the present invention, the microprocessor unit is configured to find out a reference parameter for a first dark current generated by a first photodiode from the lookup table unit after receiving a temperature sensing signal from the temperature sensing unit. Subsequently, based on the reference parameter, the conversion unit utilizes an active amplifier circuit arranged in the internal thereof to amplifying a second dark current generated by a second photodiode, so as to make the second dark current approach the first dark current. Therefore, after subtracting an output current of the first photodiode from the second dark current been treated with the current amplifying process, the output current of the first photodiode been treated with a leakage current compensating process is hence produced and outputted.

In order to achieve the primary objective of the present invention, the inventor of the present invention provides one embodiment for the ambient light sensor with photodiode leakage current compensation, which is connected to an optical sensing unit for accessing at least one photocurrent outputted by the optical sensing unit, so as to treat the photocurrent with a leakage current compensating process; wherein the optical sensing unit comprises at least one first photodiode with a first circuit area, at least one second photodiode with a second circuit area smaller than the first circuit area, and a shielding cover disposed over the second photodiode; the ambient light sensor comprises:

a temperature sensing unit for monitoring an ambient temperature;

a microprocessor unit, being coupled to the temperature sensing unit;

a conversion unit, being coupled to the first photodiode and the second photodiode, and having a gain-tunable active amplifier circuit; and a lookup table unit, being coupled between the microprocessor unit and the conversion unit; and wherein according to the ambient temperature measured by the temperature sensing unit, the microprocessor unit finding out a reference parameter for a first dark current generated by the first photodiode from the lookup table unit;

wherein based on the reference parameter, the conversion unit utilizing the active amplifier circuit to amplifying a second dark current generated by the second photodiode, so as to make the second dark current approach the first dark current.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an ambient light sensor with photodiode leakage current compensation according to the present invention, embodiments of the present invention will be described in detail with reference to the attached drawings hereinafter.

Figure 3:
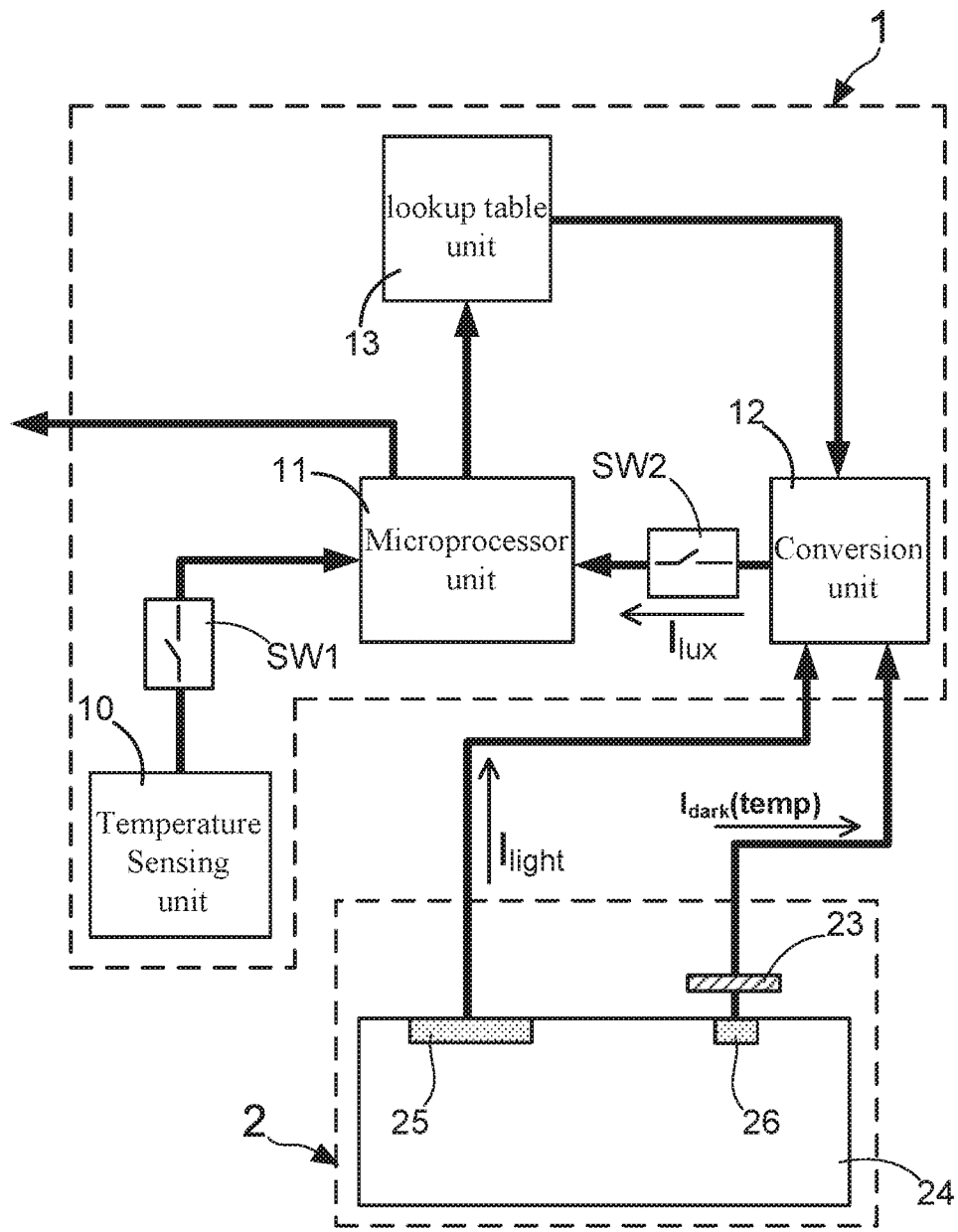
FIG. 3 shows a block diagram of an ambient light sensor with photodiode leakage current compensation according to the present invention.
Figure 4:
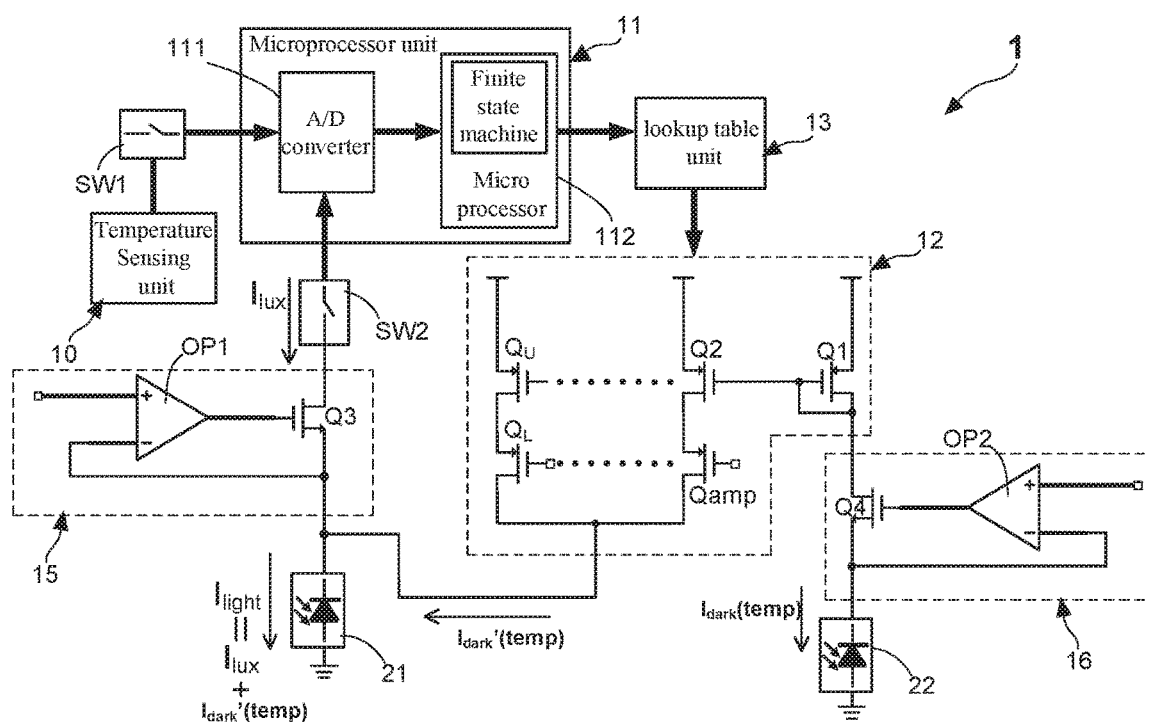
FIG. 4 shows a circuit architecture diagram of the ambient light sensor with photodiode leakage current compensation.

Please refer to FIG. 3, which illustrates a block diagram of an ambient light sensor with photodiode leakage current compensation according to the present invention. Moreover, please simultaneously refer to FIG. 4, where a circuit architecture diagram of the ambient light sensor with photodiode leakage current compensation is provided. As FIG. 3 and FIG. 4 show, the ambient light sensor 1 of the present invention is connected to an optical sensing unit 2 for accessing at least one photocurrent outputted by the optical sensing unit 2, so as to treat the photocurrent with a leakage current compensating process. The said optical sensing unit 2 comprises at least one first photodiode 21 with a first circuit area, at least one second photodiode 22 with a second circuit area, and a shielding cover 23 disposed over the second photodiode 22.

Figure 1:
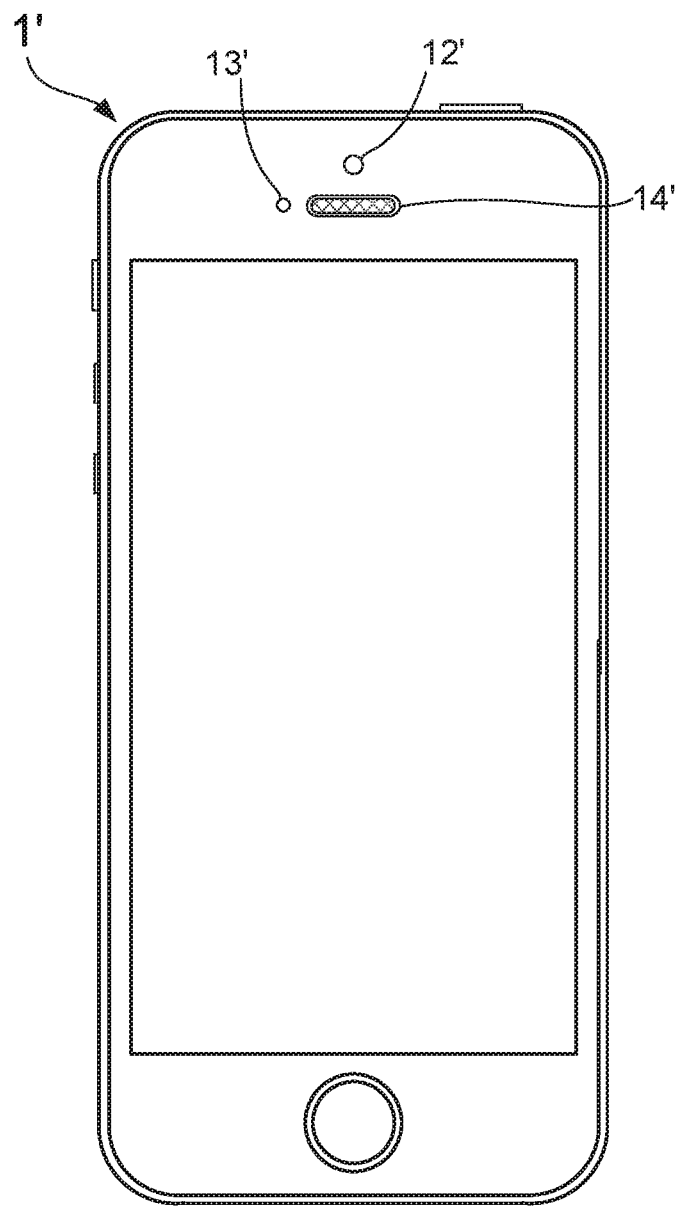
FIG. 1 shows a top view of a smart phone.
Figure 2:
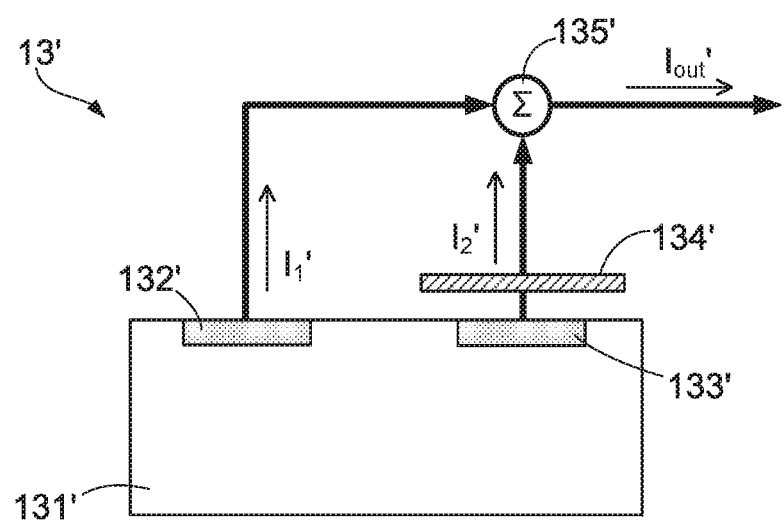
FIG. 2 shows a circuit architecture diagram of the ambient light sensor is provided.

Differing from the conventional technology using two photodiodes having the same circuit area to achieve a specific leakage current compensation in the ambient light sensor 13' (as shown in FIG. 2), in the present invention, the second circuit area of the second photodiode 22 is particularly designed to be smaller than the first circuit area of the first photodiode 21. The second photodiode 22 with small area is easy to be integrated in an integrated circuit. For instance, when designing the circuit architecture of the ambient light sensor 1 of the present invention, it is able to firstly design a main layout pattern for all circuit units and the first photodiode 21 in a fixed or limited circuit area, and then design a dummy layout pattern for the second photodiode 22 in redundancy area (i.e., remaining area of the fixed circuit area). As FIG. 3 shows, a first diffusion region 25 and a silicon substrate 24 constitute the first photodiode 21, and the second photodiode 22 is formed by a second diffusion region 26 and the silicon substrate 24. Herein, it needs to explain that, both the first photodiode 21 and the second photodiode 22 are not limited to single element or device, but can be a photodiode array for enhancing efficiency of ambient light sensing.

Referring to FIG. 3 and FIG. 4 again. The ambient light sensor 1 of the present invention comprises: a temperature sensing unit 10 for monitoring an ambient temperature, a microprocessor unit 11, a conversion unit 12, a lookup table unit 13, a first switch SW1, a second switch SW2, a first bias maintaining unit 15, and a second bias maintaining unit 16. The conversion unit 12 is coupled to the first photodiode 21 and the second photodiode 22, and the temperature sensing unit 10 is coupled to the microprocessor unit 11. In addition, the microprocessor unit 11 is also coupled to the conversion unit 12 and the lookup table unit 13, so as to make the lookup table unit 13 be coupled between the microprocessor unit 11 and the conversion unit 12. By such arrangement of the circuit units, the microprocessor unit 11 is able to find out a reference parameter for a first dark current generated by the first photodiode 21 from the lookup table unit 13 after receiving a temperature sensing signal from the temperature sensing unit 10. Furthermore, based on the reference parameter, the conversion unit 12 utilizes an active amplifier circuit arranged in the internal thereof to amplifying a second dark current generated by the second photodiode 22, so as to make the second dark current approach the first dark current.

In order to facilitate this ambient light sensor 1 be individually operated in a calibration mode and a normal operation mode, a first switch SW1 and a second switch SW2 are added into the circuit architecture of the ambient light sensor 1. As FIG. 3 and FIG. 4 show, the first switch SW1 is coupled between the temperature sensing unit 10 and an analog-to-digital converter 111 of the microprocessor unit 11, and the second switch SW2 is coupled between the analog-to-digital converter 111 and the first photodiode 21. Thus, by the using of the two switches, it is able to control the said ambient light sensor 1 to operate in a calibration mode by switching the first switch SW1 and the second switch SW2 to short circuit and open circuit, respectively. On the contrary, when the first switch SW1 is switched to open circuit and the second switch SW2 is switched to short circuit, the ambient light sensor 1 is operated in a normal operation mode.

During the calibration mode of the ambient light sensor 1, the analog-to-digital converter 111 is configured to convert the temperature sensing signal outputted by the temperature sensing unit 10 to a digital temperature sensing signal. Subsequently, after receiving the digital temperature sensing signal, a finite state machine (FSM) arranged in the microprocessor 112 correspondingly outputs a state signal to the lookup table 13, such that the microprocessor 112 is able to access a reference parameter for a first dark current generated by the first photodiode 21 from the lookup table unit 13.

Furthermore, the active amplifier circuit in the conversion unit 12 would be properly set for amplifying a second dark current generated by the second photodiode 22.

Figure 5:
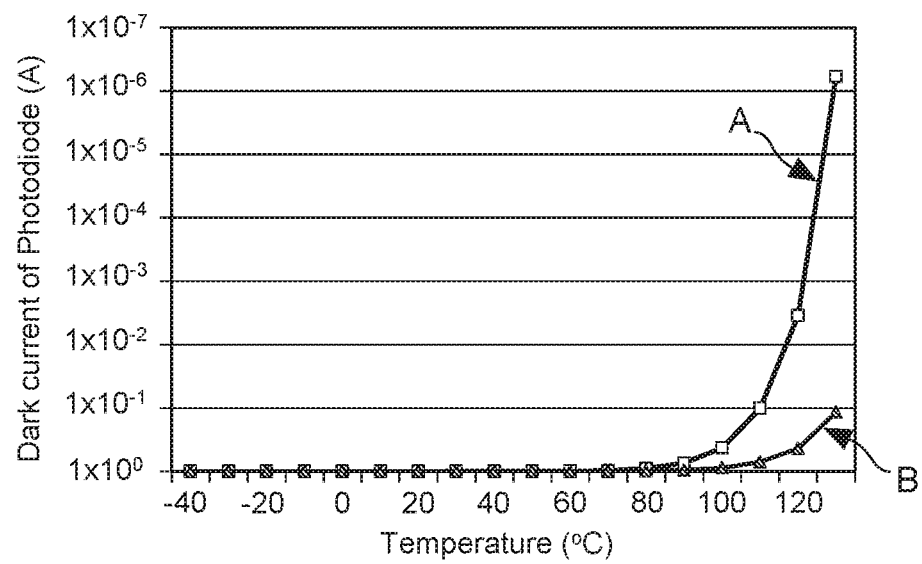
FIG. 5 shows a data curve graph of temperature versus dark current.

It is assumed that, since the second area is smaller than the first area, the current level of the second dark current must be lower than the first dark current's. Please refer to FIG. 5, where a data curve graph of temperature versus dark current is provided. In FIG. 5, curve A and curve B represent data of temperature-dependent dark current measured from the first photodiode 21 and the second photodiode 22, respectively. Thus, from the current data of FIG. 5, engineers skilled in development and design of electronic circuits would normally conscious that both the first dark current and the second dark current would change with the variation of ambient temperature, so that the active amplifier circuit in the conversion unit 12 must be particularly designed to a gain-tunable active amplifier circuit.

Figure 6:
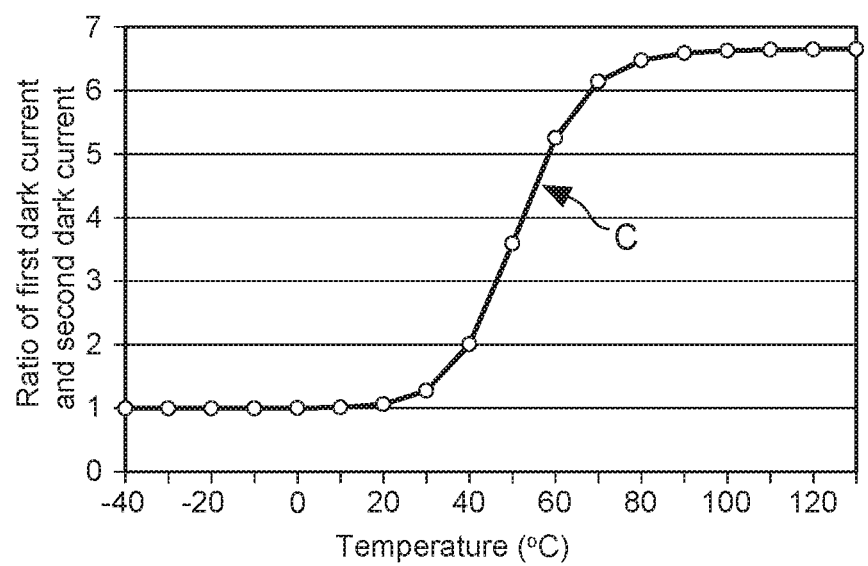
FIG. 6 shows a data curve graph of current ration versus temperature.

Please continuously refer to FIG. 6, which shows a data curve graph of current ration versus temperature. When carrying out the ambient light sensor 1 of the present invention, it is able to establish a lookup table of the current ratio calculated based on the temperature-dependent first dark current and the temperature-dependent second dark current in the lookup table unit 13. Thus, according to the ambient temperature measured by the temperature sensing unit 10, the microprocessor unit 11 can immediately find out a corresponding current ratio from the lookup table unit 13 for being taken as a magnification ratio for amplifying the second dark current to the first dark current.

As FIG. 4 shows, for facilitating a current gain of the active amplifier circuit in the conversion unit 12 can be properly modulated based on the current ratio found from the lookup table unit 13, the present invention particularly constitutes a signal-amplifying MOSFET $Q_{amp}$, a current mirror circuit, and N number of cascode MOSFET pairs to the said gain-tunable active amplifier circuit. It is worth explaining that, each of the cascode MOSFET pairs comprises an upper MOSFET $Q_U$ and a lower MOSFET $Q_L$, and the upper MOSFETs $Q_U$ and a current mirror consisting of a first MOSFET Q1 and a second MOSFET Q2 further constitute an active load of the signal-amplifying MOSFET $Q_{amp}$. In this active amplifier circuit, the signal-amplifying MOSFET $Q_{amp}$ is coupled to a control signal by the gate terminal thereof, and the drain terminal of the signal-amplifying MOSFET $Q_{amp}$ is coupled between the first photodiode 21 and the analog-to-digital converter 111. Moreover, the lower MOSFET $Q_L$ is an enable/disable switch for the upper MOSFET $Q_U$.

In the circuit arrangements of the active amplifier circuit, the gate terminal of the first MOSFET Q1 is coupled to the gate terminal of the second MOSFET Q2, and both the source terminal of the first MOSFET Q1 and the source terminal of the second MOSFET Q2 are coupled to a bias voltage. In addition, the drain terminal and the gate terminal of the first MOSFET Q1 are coupled to each other, and the drain terminal of the second MOSFET Q2 is coupled to the source terminal of the signal-amplifying MOSFET $Q_{amp}$. It is worth noting that, the gate terminal and the source terminal of the upper MOSFET $Q_U$ are respectively coupled to the gate terminal of the second MOSFET Q2 and the bias voltage. Moreover, the source terminal and the drain terminal of the lower MOSFET $Q_L$ are individually coupled to the drain terminal of the upper MOSFET $Q_U$ and the drain terminal of the signal-amplifying MOSFET $Q_{amp}$. Furthermore, the gate terminal of the lower MOSFET $Q_L$ is coupled to a switch controlling signal outputted by the lookup table unit 13. On the other hand, the first photodiode 21 is coupled to a common connection point of the drain terminal of the signal-amplifying MOSFET $Q_{amp}$ and the drain terminal of the lower MOSFET $Q_L$.

As FIG. 4 shows, symbols of $I_{dark}$(temp), $I_{dark}'$(temp), and $I_{light}$ represent the second dark current, the second dark current been treated with a current amplifying process, and an output current of the first photodiode 21, respectively. Moreover, through the circuit architecture shown in FIG. 4, the electronic engineers are able to establish following two mathematical formulas for calculating $I_{dark}'$(temp), and $I_{light}$:

$$I_{light} = I_{lux} + I_{dark}'(\text{temp}) \quad (1)$$

$$I_{dark}'(\text{temp}) = \frac{Q[m:0](\text{temp})}{Q1} \times I_{dark}(\text{temp}) \quad (2)$$

In the above-listed mathematical formulas, Q[m:0](temp) means a total number of the second MOSFET Q1 and at least one upper MOSFET $Q_U$ which are switched on, and Q1 represent the number of the first MOSFET Q1. Moreover, $I_{lux}$ represents the output current of the first photodiode 21 been treated with a leakage current compensating process. From the two mathematical formulas, electronic engineers should know that the output current of the first photodiode 21 been treated with a leakage current compensating process (i.e., $I_{lux}$) can be calculated by subtracting the $I_{light}$ from the $I_{dark}'$(temp). As FIG. 4 shows, for carrying the current subtraction operation in the circuit architecture of the ambient light sensor 1, Kirchhoff's law is implemented in the circuit node between $I_{dark}'$(temp), $I_{light}$ and $I_{lux}$. By such design, it is guaranteed that the current signal received by the analog-to-digital converter 111 must be the output current of the first photodiode 21 been treated with a leakage current compensating process (i.e., $I_{lux}$). Subsequently, the $I_{lux}$ signal would be converted to a digital signal as the ambient light sensor 1 is operated in a normal operation mode.

It is worth explaining that, to ensure that the first photodiode 21 and the second photodiode 22 are kept in reverse-biased operation, a first bias maintaining unit 15 and a second bias maintaining unit 16 are added into the architecture of the ambient light sensor 1. As FIG. 4 shows, the first bias maintaining unit 15 comprises a first MOSFET switch Q3 and a first comparator OP1, wherein the first MOSFET switch Q3 is coupled to the analog-to-digital converter 111 and the first photodiode 21 by the drain terminal and the source terminal thereof, respectively. On the other hand, the first comparator OP1 is coupled to a reference voltage $V_{diode}$ and the gate terminal of the first MOSFET switch Q3 by the positive input terminal and the output terminal thereof, respectively. Moreover, the negative input terminal of the first comparator OP1 is coupled between the source terminal of the first MOSFET switch Q3 and the first photodiode 21.

Please referring to FIG. 4 again. The second bias maintaining unit 16 comprises a second MOSFET switch Q4 and a second comparator OP2, wherein the second MOSFET switch Q4 is coupled to drain terminal of the first MOSFET Q1 and the second photodiode 22 by the drain terminal and the source terminal thereof, respectively. On the other hand, the second comparator OP2 is also coupled to the reference voltage $V_{diode}$ and the gate terminal of the second MOSFET switch Q4 by the positive input terminal and the output terminal thereof, respectively. Moreover, the negative input terminal of the second comparator OP2 is coupled between the source terminal of the second MOSFET switch Q4 and the second photodiode 22.

Figure 7A:
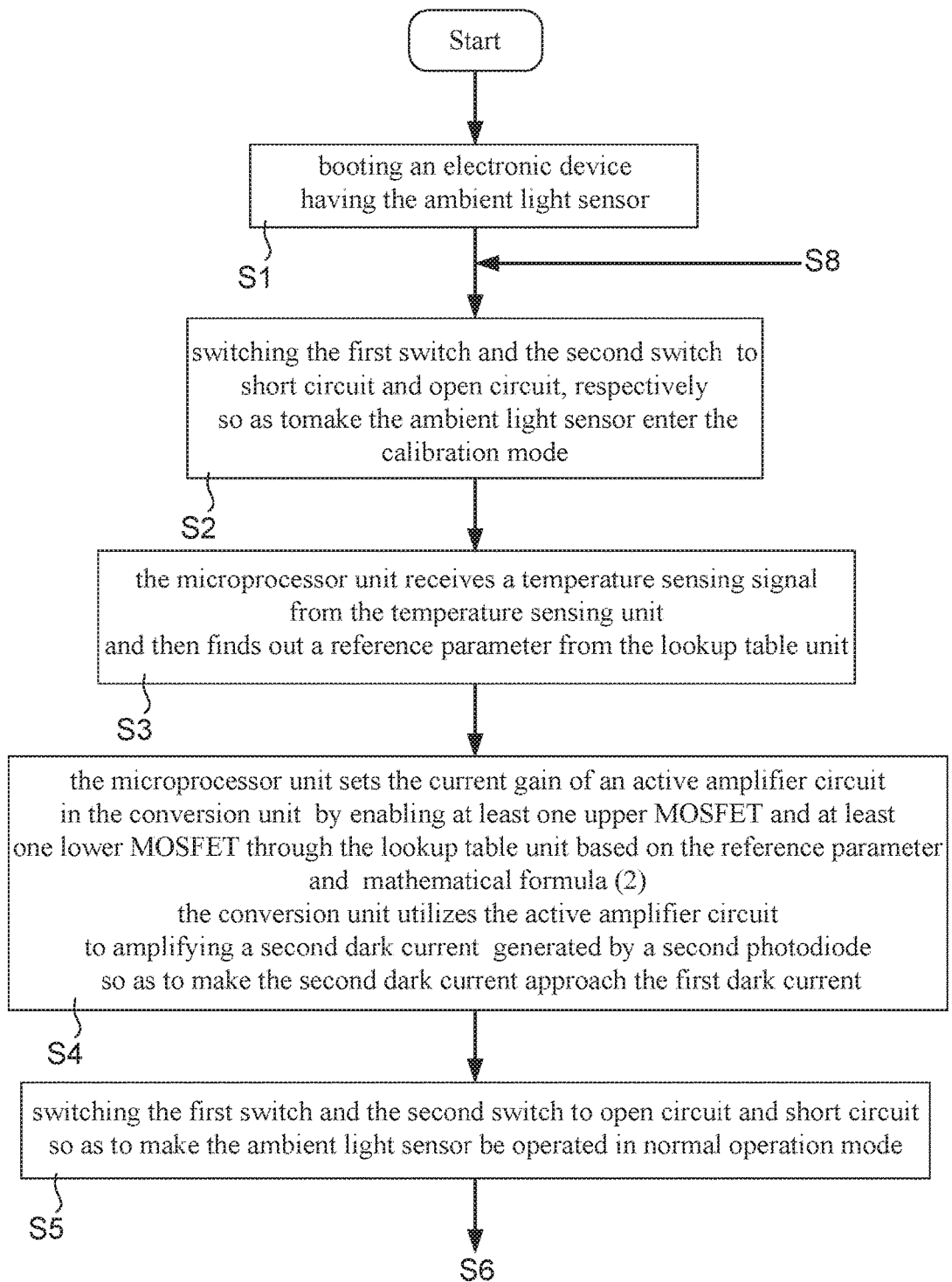
FIG. 7A and FIG. 7B show flow charts including a plurality of execution steps of a circuit controlling algorithm.
Figure 7B:
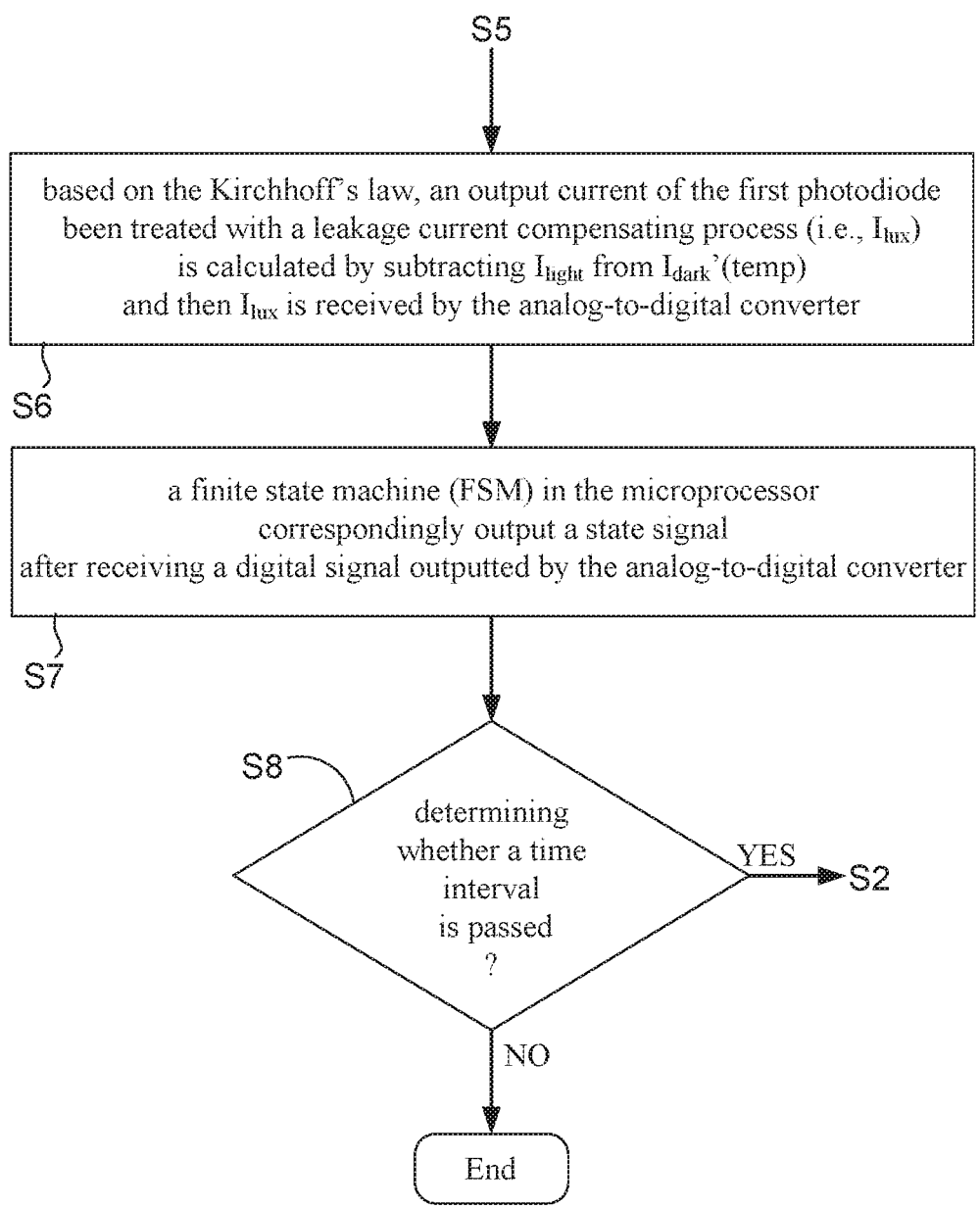

Herein, it needs to further explain that, for facilitating this novel ambient light sensor 1 automatically enter the calibration mode for executing the leakage current compensating process, it is able to embed a circuit controlling algorithm into the microprocessor unit 11. FIG. 7A and FIG. 7B exhibit flow charts including a plurality of execution steps of the circuit controlling algorithm. In steps (S1) and (S2) of the flow charts, the first switch SW1 and the second switch SW2 are respectively switch to short circuit and open circuit after an electronic device having the ambient light sensor 1 is booted, so as to make the ambient light sensor 1 enter the calibration mode. For example, the ambient light sensor 1 is operated in the calibration mode after a user powers on his smart phone.

Subsequently, in step (S3) of the flow charts, the microprocessor unit 11 receives the temperature sensing signal from the temperature sensing unit 10, and then finds out a reference parameter (i.e., the current ratio) from the lookup table unit 13. Next, in step (S4) of the flow charts, the microprocessor unit 11 sets the current gain of the active amplifier circuit in the conversion unit 12 by enabling at least one upper MOSFET $Q_U$ and at least one lower MOSFET $Q_L$ through the lookup table unit 13 based on the current ratio and above-presented mathematical formula (2); therefore, the conversion unit 12 utilize the active amplifier circuit to amplifying the second dark current generated by the second photodiode 22, so as to make the second dark current approach the first dark current.

After obtaining the second dark current been treated with a current amplifying process (i.e., the $I_{dark}'(temp)$), the first switch SW1 and the second switch SW2 are respectively switched to open circuit and short circuit in step (5) of the flow charts, such that the ambient light sensor 1 is operated in the normal operation mode. Meanwhile, based on the Kirchhoff's law, the output current of the first photodiode 21 been treated with a leakage current compensating process (i.e., $I_{lux}$) is calculated by subtracting the $I_{light}$ from the $I_{dark}'(temp)$ in step (S6) of the flow charts, and then the $I_{lux}$ is received by the analog-to-digital converter 111. Eventually, in step (S7) of the flow charts, the finite state machine (FSM) 112 in the microprocessor correspondingly output a state signal after receiving a digital signal outputted by the analog-to-digital converter 111, so as to facilitate a main controlling circuitry of the smart phone be able to properly adjust the backlight brightness of the touch screen with the brightness variation of the ambient light.

It is worth explaining that the circuit controlling algorithm further comprises an execution step of (S8), which is configured to make the circuit controlling flow go back to the step (S2) after a significant time interval has passed. The said time interval is such as but not limited to 10 seconds. By such design for the circuit controlling algorithm, the ambient light sensor 1 would automatically execute the leakage current compensation process 1 time per 10 seconds.

Therefore, through above descriptions, the ambient light sensor 1 with photodiode leakage current compensation provided by the present invention has been introduced completely and clearly; in summary, the present invention includes the advantages of:

(1) Differing from conventional ambient light sensor 13' (as shown in FIG. 2) at least having drawbacks of huge circuit area and high manufacturing cost, the present invention discloses an ambient light sensor 1 showing advantages of small circuit area and low manufacturing cost. This ambient light sensor 1 has functionality of photodiode leakage current compensation, and comprises: a temperature sensing unit 10, a microprocessor unit 11, a conversion unit 12, and a lookup table unit 13. Under the operation of the ambient light sensor 1 of the present invention, the microprocessor unit 11 is configured to find out a reference parameter for a first dark current generated by a first photodiode 21 from the lookup table unit 13 after receiving a temperature sensing signal from the temperature sensing unit 10. Subsequently, based on the reference parameter, the conversion unit 12 utilizes an active amplifier circuit arranged in the internal thereof to amplifying a second dark current generated by a second photodiode 22, so as to make the second dark current approach the first dark current. Therefore, after subtracting an output current of the first photodiode 21 from the second dark current been treated with the current amplifying process, the output current of the first photodiode 21 been treated with a leakage current compensating process is hence produced and outputted.

The above description is made on embodiments of the present invention. However, the embodiments are not intended to limit scope of the present invention, and all equivalent implementations or alterations within the spirit of the present invention still fall within the scope of the present invention.

What is claimed is:

1. An ambient light sensor with photodiode leakage current compensation, being connected to an optical sensing unit for accessing at least one photocurrent outputted by the optical sensing unit, so as to treat the photocurrent with a leakage current compensating process; wherein the optical sensing unit comprises at least one first photodiode with a first circuit area, at least one second photodiode with a second circuit area smaller than the first circuit area, and a shielding cover disposed over the second photodiode; the ambient light sensor comprising:

a temperature sensing unit for monitoring an ambient temperature;

a microprocessor unit, being coupled to the temperature sensing unit;

a conversion unit, being coupled to the first photodiode and the second photodiode, and having a gain-tunable active amplifier circuit; and a lookup table unit, being coupled between the microprocessor unit and the conversion unit;

a first bias maintaining unit, comprising:

a first MOSFET switch, being respectively coupled to the microprocessor unit and the first photodiode by the drain terminal and the source terminal thereof; and a first comparator, being respectively coupled to a reference voltage and the gate terminal of the first MOSFET switch by a positive input terminal and an output terminal thereof, and a negative input terminal of the first comparator is coupled between the source terminal of the first MOSFET switch and the first photodiode; and a second bias maintaining unit, comprising:

a second MOSFET switch, being respectively coupled to the conversion unit and the second photodiode by the drain terminal and the source terminal thereof; and a second comparator, being respectively coupled to the reference voltage and a gate terminal of the second MOSFET switch by a positive input terminal and an output terminal thereof, and a negative input terminal of the second comparator is coupled between the source terminal of the second MOSFET switch and the first photodiode;

wherein according to the ambient temperature measured by the temperature sensing unit, the microprocessor unit finding out a reference parameter for a first dark current generated by the first photodiode from the lookup table unit;

wherein based on the reference parameter, the conversion unit utilizing the active amplifier circuit to amplifying a second dark current generated by the second photodiode, so as to make the second dark current approach the first dark current.

2. The ambient light sensor with photodiode leakage current compensation of claim 1, wherein the reference parameter is a current ratio between the first dark current and the second dark current.

3. The ambient light sensor with photodiode leakage current compensation of claim 1, wherein the microprocessor unit comprises:
   an analog-to-digital converter, being coupled to the temperature sensing unit and the first photodiode, and being further coupled to the drain terminal of the first MOSFET switch; and
   a microprocessor, being coupled to the analog-to-digital converter and comprising a finite state machine (FSM), wherein the microprocessor is used for receiving a digital signal outputted by the analog-to-digital converter, so as to correspondingly output a state signal.

4. The ambient light sensor with photodiode leakage current compensation of claim 3, further comprising:
   a first switch, being coupled between the temperature sensing unit and the analog-to-digital converter; and
   a second switch, being coupled between the first photodiode and the analog-to-digital converter.

5. The ambient light sensor with photodiode leakage current compensation of claim 4, wherein when the first switch is switched to short circuit and the second switch is switched to open circuit, the said ambient light sensor being operated in a calibration mode.

6. The ambient light sensor with photodiode leakage current compensation of claim 4, wherein when the first switch is switched to open circuit and the second switch is switched to short circuit, the said ambient light sensor being operated in a normal operation mode.

7. The ambient light sensor with photodiode leakage current compensation of claim 3, wherein the conversion unit comprises:
   a signal-amplifying MOSFET, being coupled to a control signal by the gate terminal thereof, and the drain terminal of the signal-amplifying MOSFET being coupled between the first photodiode and the analog-to-digital converter;
   a current mirror circuit, being configured as an active load of the signal-amplifying MOSFET and comprising a first MOSFET and a second MOSFET; wherein the gate terminal of the first MOSFET is coupled to the gate terminal of the second MOSFET, and the source terminal of the first MOSFET and the source terminal of the second MOSFET being coupled to a bias voltage; moreover, the drain terminal of the first MOSFET being coupled to the drain terminal of the first MOSFET switch and the gate terminal thereof, and the drain terminal of the second MOSFET being coupled to the source terminal of the signal-amplifying MOSFET; and
   N number of cascode MOSFET pairs, wherein each of the cascode MOSFET pairs comprises an upper MOSFET and a lower MOSFET, and the gate terminal and the source terminal of the upper MOSFET being respectively coupled to the gate terminal of the second MOSFET and the bias voltage; moreover, the source terminal and the drain terminal of the lower MOSFET being individually coupled to the drain terminal of the upper MOSFET and the drain terminal of the signal-amplifying MOSFET; furthermore, the gate terminal of the lower MOSFET being coupled to a switch controlling signal outputted by the lookup table unit;
   wherein the first photodiode is coupled to a common connection point of the drain terminal of the signal-amplifying MOSFET and the drain terminal of the lower MOSFET.

* * * * *